(12) United States Patent
Yen et al.

(10) Patent No.: US 6,512,221 B2
(45) Date of Patent: Jan. 28, 2003

(54) IMAGE SENSOR CHIP WITH AN INTEGRATED OPERATIONAL AMPLIFIER AND ITS APPLICATION IN A CIS MODULE

(75) Inventors: Yung Chau Yen, Cupertino, CA (US); Weng-Lyang Wang, Cupertino, CA (US)

(73) Assignee: CMOS Sensor, Inc., Cupertino, CA (US)

(*) Notice: Subject to any disclaimer, the term of this patent is extended or adjusted under 35 U.S.C. 154(b) by 0 days.

(21) Appl. No.: 09/808,075

(22) Filed: Mar. 13, 2001

(65) Prior Publication Data
US 2002/0131250 A1 Sep. 19, 2002

(51) Int. Cl.[7] .............................................. H01L 27/00

(52) U.S. Cl. .............................. 250/208.1; 250/214 R; 250/214 A; 250/214.1; 257/443; 257/291; 348/294; 348/300

(58) Field of Search .......................... 250/208.1, 214 R, 250/214 A, 214.1; 257/291, 443, 249, 225; 330/308, 309, 59; 348/294, 300, 302, 241, 308, 552, 207

(56) References Cited

U.S. PATENT DOCUMENTS 4,775,894 A * 10/1988 Traupe et al. ............... 358/294
4,775,895 A * 10/1988 Traupe et al. ............... 358/294

* cited by examiner

Primary Examiner—Stephone B. Allen
Assistant Examiner—Christopher W. Glass
(74) Attorney, Agent, or Firm—Pacific Law Group LLP; Chi Ping Chang (57) ABSTRACT

A sensor chip with an on-chip operational amplifier is described for the formation into a sensor array of a Contact Image Sensor (CIS) module. A number of extra on-chip bonding pads are provided which are electrically connected to the operational amplifier, the associated input resistor and the charge integration capacitor in a selective manner. A number of extra off-chip common conductor stripes are also provided on the substrate for the chip array. A set of wiring patterns are then used to selectively connect these on-chip bonding pads with their corresponding off-chip common conductor stripes resulting in a CIS module which provides both a variable gain of a selected single operational amplifier and an equivalent charge integration capacitance which is the summation of the capacitors from the individual sensor chips within the chip array. Additionally, the associated input resistors can be replaced with an MOS transistor whose control gate can be similarly programmed with the wiring pattern.

32 Claims, 6 Drawing Sheets

IMAGE SENSOR CHIP WITH AN INTEGRATED OPERATIONAL AMPLIFIER AND ITS APPLICATION IN A CIS MODULE

FIELD OF THE INVENTION

This invention is related to the field of the CIS (Contact Image Sensor) technology, in particular, it concerns the manufacturing of a sensor chip and the assembly of a CIS module with a butting technique to form a sensor chip array.

BACKGROUND OF THE INVENTION

Figure 1:
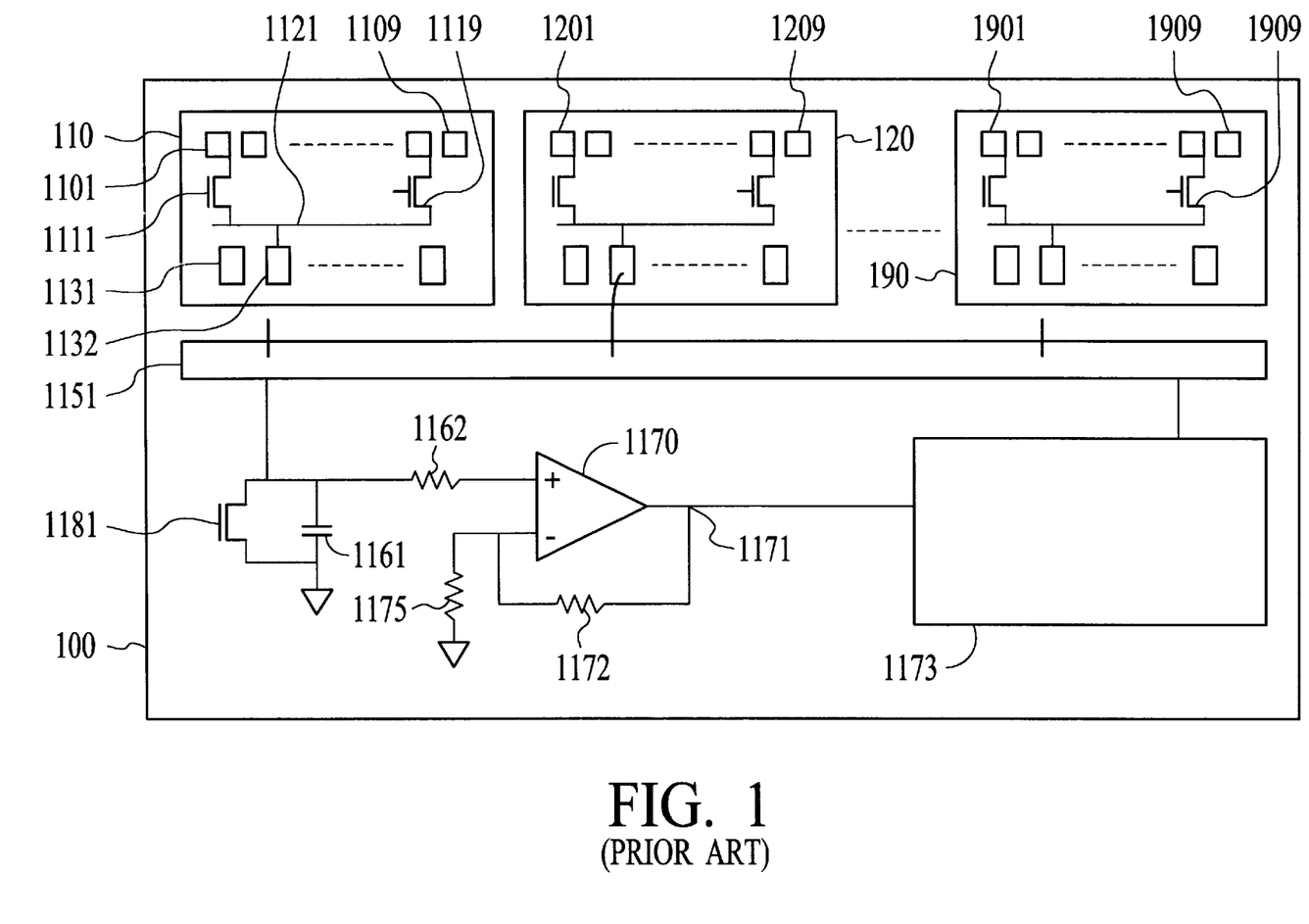
FIG. 1 shows a prior art technique in a simplified block diagram to read out the photo-signal from each pixel of a linear sensor array.in a chip array attached to a PCB.

The prior art technique of butting for the assembly of a sensor array inside a CIS module is schematically illustrated in FIG. 1 wherein a PCB (Printed Circuits Board) 100 is shown. Sensor chips 110, 120, ..., 190 were attached to the PCB 100 and butted to form a linear array. All the sensor chips 110, 120, ..., 190 were of the same design and were manufactured with the same process. That is, the pixel arrays (1101 to 1109), (1201 to 1209) and (1901 to 1909) were the same. Likewise, the mux (multiplexing) switch arrays (1111 to 1119) from chip 110 and (1911 to 1919) from chip 190 were the same. In each of the sensor chips 110, 120 and 190, each switch of the mux switch array was connected between a corresponding pixel and a single common line. For example, in chip 110, the common line is designated as 1121. In turn, the common line 1121 was connected to an output bonding pad 1132. Other bonding pads,: like bonding pad 1131 in chip 110, are shown with no connections on purpose, as they are not relevant to the current invention.

The output bonding pad 1132 from chip 110 and the other output bonding pads from the other chips were wire bonded to a common conductor stripe 1151, which in turn was connected to an associated electronic block 1173 necessary for the proper functioning of the CIS module. The detail of the electronic block 1173 is not shown here as it is not relevant to the current invention. Additionally, if the pixel of the sensor array was of a photo-transistor type, the common conductor stripe 1151 was connected to a charge integrating capacitor 1161 and an input resistor 1162, which in turn was connected to the non-inverting input terminal of an operational amplifier (OP) 1170. However, if the pixel of the sensor array was of a photo-diode type, the charge integrating capacitor 1161 can be omitted from the circuitry. The output terminal 1171 of operational amplifier 1170 was connected to the electronic block 1173 for final output of the photo-signal from each pixel. A feedback resistor 1172 was connected between the output terminal 1171 and the inverting input terminal of the operational amplifier 1170. A gain-control resistor 1175 was connected between the inverting input terminal of the operational amplifier 1170 and ground. The operational principle of the sensor array can be described as follows:

After a desired time period of exposure of the sensor array to an incident light, the generated light-signal from each pixel was read by applying a read signal pulse to turn on an individual switch of the mux switch array in sequential order from left to right of each chip. After the light-signal from the last pixel of the first chip 110 was read, the first pixel 1201 of the next butted chip 120 was read and so on until the reading of the light-signal from the last pixel 1909 of the last chip 190 to complete the reading of light-signal from the entire sensor array on the PCB 100.

Next, the process of generation of the light-signal from a pixel and its readout is described in more detail. With the mux switch 1111 turned on, the charge integrating capacitor 1161 started to sense the light-signal from the first pixel 1101 by accumulating the photo-charge flowing from the first pixel. The light-signal from the first pixel 1101 of the first chip 110 was then amplified by the operational amplifier 1170 with a gain which was determined by the ratio of the feedback resistor 1172 to the gain-control resistor 1175. The amplified light-signal from the first pixel 1101 appeared at the output terminal 1171 of the operational amplifier 1170 and was transferred to the outside system through the associated electronic block 1173. After reading the light-signal from the first pixel 1101 of the first chip 110, the stored photo-charge of the charge integrating capacitor 1161 was cleared by applying a reset signal pulse to turn on a reset switch 1181 which was a transistor connected across the charge integrating capacitor 1161. The charge integrating capacitor 1161 was then ready to read the light-signal from the next pixel. Thus, a second read pulse was applied to turn on the second mux switch connecting the second pixel of the first chip 110 and the common conductor stripe 1121. The aforementioned reading process of the light-signal from the first pixel 1101 was repeated to acquire the light-signal from the second pixel. This reading process was continued until every pixel of the first chip 110 was read. After the light-signal from the last pixel 1109 of the first chip 110 was read, the first pixel 1201 of the second chip 120 was read following the same procedure as described above. This reading process was continued on until the last pixel 1909 of the last chip 190 of the chip array to complete the reading of all the light-signals of the sensor array. Likewise, the dark-signal, which was the signal from the pixel with no light exposure, was read from each pixel of the sensor array with the same process as described above for the reading of the light-signal. Finally, the actual usable photo-signal from each pixel was computed as the corresponding light-signal minus the dark-signal for the subject pixel.

While this technique is simple, it suffers from a drawback of high assembly cost as many components, like a charge integrating capacitor 1161, three resistors 1162, 1172, 1175 and an operational amplifier 1170, are required to be assembled onto the PCB 100. The result is increased cost of the CIS module.

Figure 2:
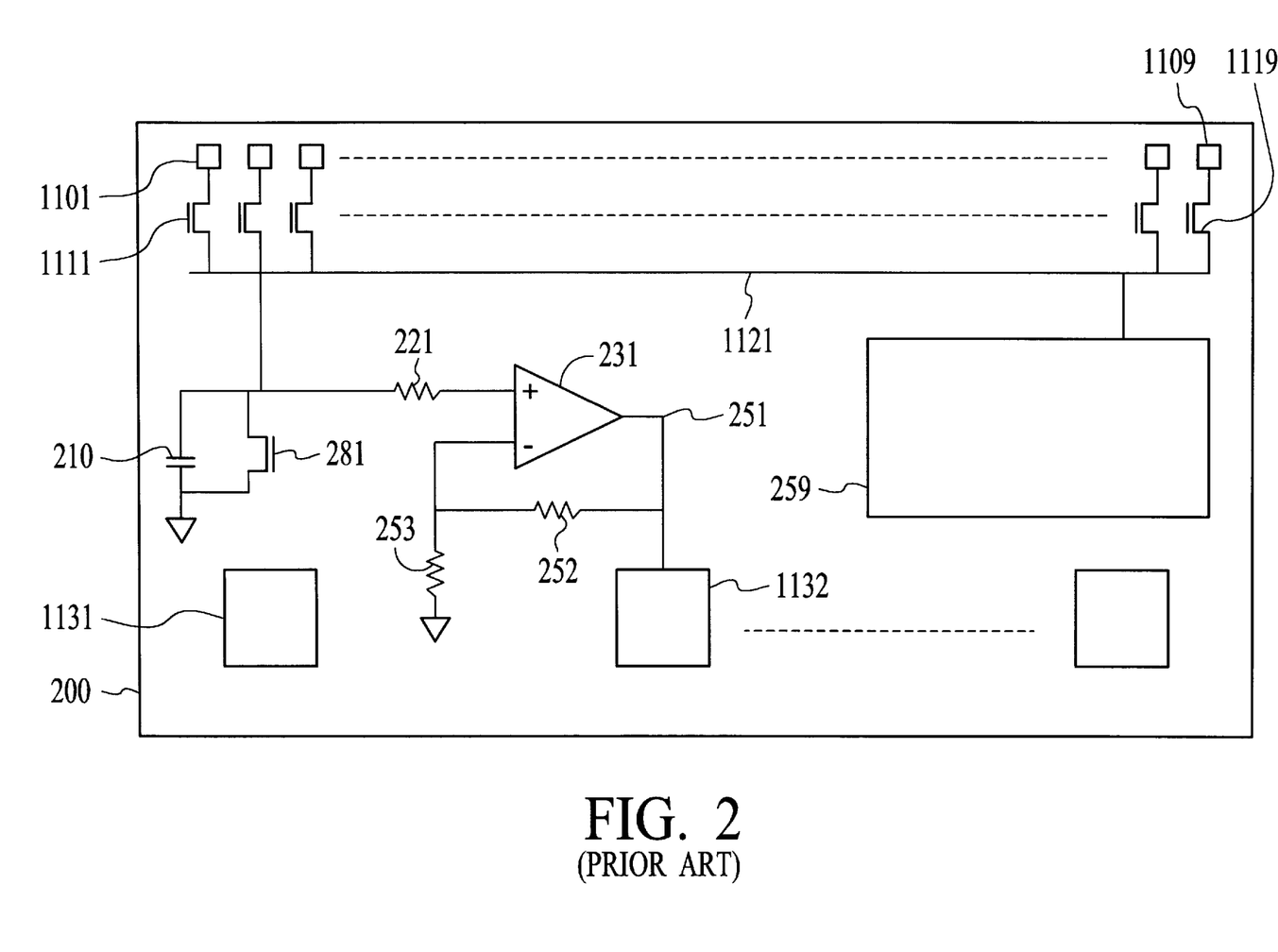
FIG. 2 shows another prior art technique with an integrated operational amplifier on the sensor chip to read the photo-signal.

In order to reduce the cost of the CIS module, an approach was taken to integrate the operational amplifier into the sensor chip. This is illustrated in FIG. 2. From now on, the same component designation will be used in different figures whenever either the same component or a component with the same function is encountered. As shown, the sensor chip 200 now included additional components of a charge integrating capacitor 210, a reset switch 281, an operational amplifier 231 plus two resistors, a feedback-resistor 252 and a gain-control resistor 253 in contrast to the conventional sensor chips 110, 120, ..., 190 from FIG. 1. An output bonding pad 1132 was provided for the output-terminal 251 of the operational amplifier 231. Each operational amplifier functioned only while a light signal was read from the pixels within the same chip. Each chip had its own charge integrating capacitor for reading purposes. The pixel array (1101 to 1109) and the mux switch array (1111 to 1119) of the sensor chip 200 remained the same as those shown in FIG. 1. An associated electronic block 259 was also shown for other electronic functions. Thus, just like the chip array 110, 120, ... 190 from FIG. 1, many of these chips 200 with their respective on-chip operational amplifiers 231 were butted to form a sensor array of the desired length. The operational principle remained the same as described in FIG. 1 except that each chip now has its own operational amplifier instead of a common operational amplifier being shared by the entire chip array. While the associated assembly cost of the CIS module was now reduced with the corresponding reduction of component counts, other problems were brought about by this approach. Firstly, the offset voltage of the operational amplifier was different from chip to chip. Additionally, the gain of the operational amplifier also varied slightly from chip to chip. This resulted in an undesirable non-uniformity of the dark signal level. Secondly, the required size of the charge integrating capacitor 210 was usually large. Consequently it was difficult if not impossible to include the charge integrating capacitor 210 on the sensor chip 200 without increasing the chip size. Thirdly, the capacitance of the charge integrating capacitor 210 could vary from chip to chip due to variation of the manufacturing process. This resulted in an undesirable non-uniform output signal level at the output terminal of the operational amplifier 231.

Therefore, the current invention is conceived to resolve these difficulties and to improve the performance of the sensor chip with an integrated on-chip operational amplifier.

SUMMARY OF THE INVENTION

The first objective of this invention is to provide a design of a sensor chip having an integrated operational amplifier to reduce the number of components in the assembly of a CIS module.

The second objective of this invention is to provide a technique which, while disabling all other unwanted operational amplifiers in the butted chip-array on a PCB, employs only one operational amplifier from one sensor chip in the chip array for reading light-signals from all pixels of the sensor array.

The third objective of this invention is to provide a technique to achieve a variable gain of the operational amplifier.

The fourth objective of this invention is to provide a technique to distribute the required large capacitance of the charge integrating capacitor over the sensor chips in the entire chip array.

The fifth objective of this invention is to provide a technique to read a light-signal from every pixel in a selected number of sensor chips within the chip array with the same operational amplifier.

The sixth objective of this invention is to provide a technique to connect a selected number of components in a chip array to one designated location on the PCB.

BRIEF DESCRIPTION OF THE DRAWINGS

As the following drawings are provided only for the purpose of explanation of the operational principle of this invention, they are not necessarily to scale, in exact shape, size or location.

DETAILED DESCRIPTION OF PREFERRED EMBODIMENTS

Figure 3:
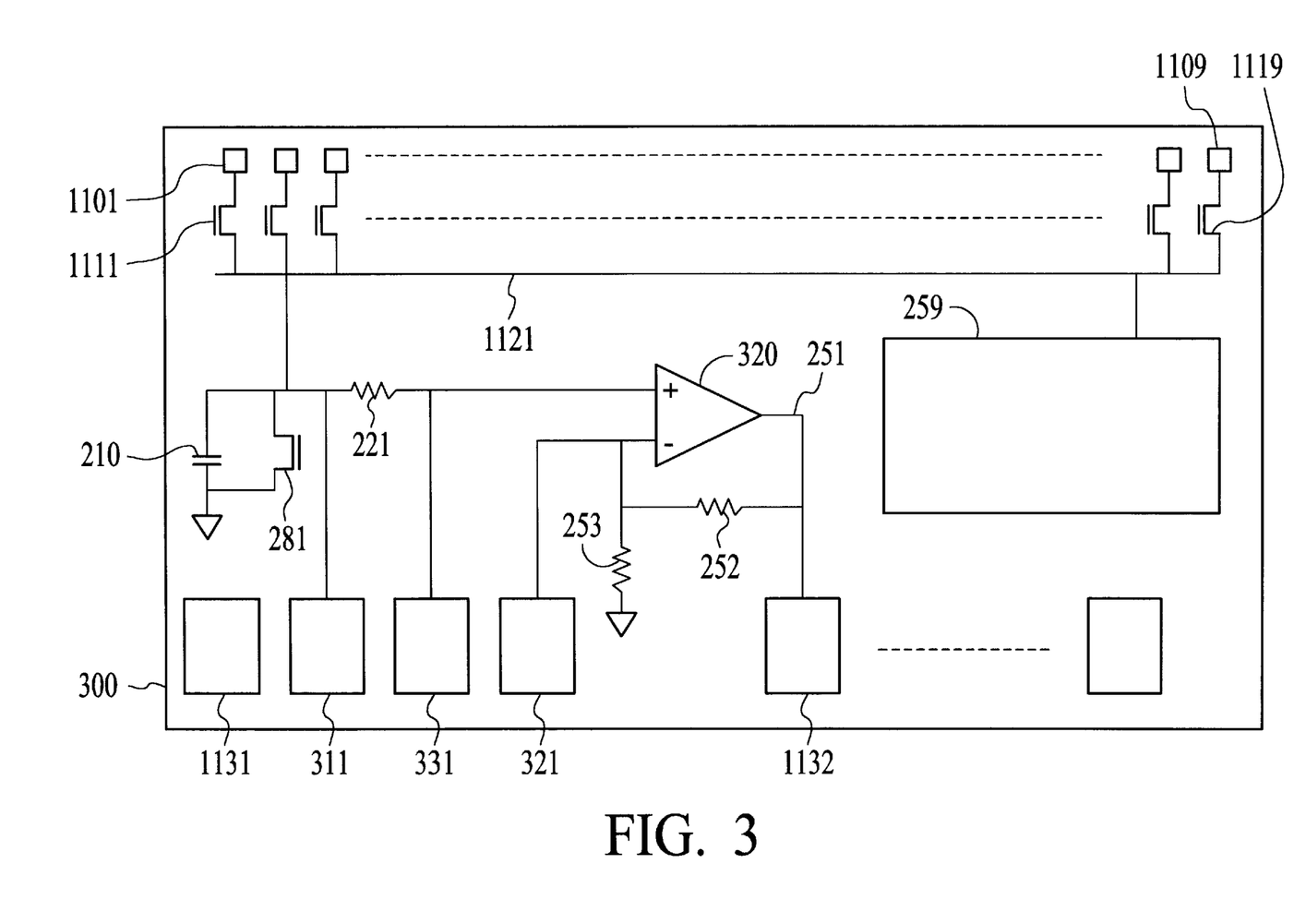
FIG. 3 shows a sensor chip of the present invention with an integrated operational amplifier on the sensor chip to read the photo-signal.

FIG. 3 shows a simplified block diagram of an improved sensor chip 300 with an integrated operational amplifier. The improved sensor chip 300 in FIG. 3 is similar to the sensor chip 200 in FIG. 2 except that there are three additional bonding pads on the improved sensor chip 300 and the capacitance of the charge integrating capacitor 210 can be much smaller enabling an easier chip design. This will be explained later. Out of the three additional bonding pads, the first one is the non-inverting bonding pad 311, the second one is the inverting bonding pad 321 connected to the inverting terminal of an operational amplifier 320, and the third one is the non-inverting terminal bonding pad 331 connected to the non-inverting terminal of the operational amplifier 320. The non-inverting bonding pad 331 is connected to the common line 1121 of the mux switch array consisting of switches (1111 to 1119), a charge integrating capacitor 210 and the non-inverting terminal of the operational amplifier 251 through a resistor 221. The charge integrating capacitor 210 has a reset switch 281 connected across it to clear charges stored in the said charge integrating capacitor when a reset pulse is applied to the reset switch 281, an MOS (Metal-Oxide-Semiconductor) transistor. The reading process of the light-signal is the same as described in FIGS. 1 and 2. Although the non-inverting terminal of the operational amplifier 320 is used as a signal reading terminal in the above example, for those skilled in this field, the design can be easily modified to use the inverting terminal of the operational amplifier instead as a signal reading terminal.

The addition of the three bonding pads, 311, 321 and 331, provide a means to improve the performance of the corresponding CIS module. The improvements are:

(1) It provides an ability to disable the chosen operational amplifiers without inducing additional noise to the sensor chip.

(2) It provides a means to distribute the required large capacitance of the charge integrating capacitor 1161 as shown in FIG. 1 over all the chips of the chip array in a CIS module. Thus, each charge integrating capacitor 210 of the improved sensor chip 300 within the chip array in a CIS module is much smaller than before. For instance, for the case of a CIS module comprising ten improved sensor chips 300 the reduction of the said capacitance will be around tenfold, etc. In turn, the decreased capacitance reduces the difficulty of the design of the sensor chip.

(3) It provides a means to vary the gain of the operational amplifier as the equivalent gain-control resistor 253 can be changed after the design of the sensor chip is fixed and manufactured by connecting a desired number of the inverting bonding pads together to reach the desired equivalent gain-control resistance. Thus, the desired gain, which is the ratio of the resistance of the feedback resistor to the equivalent gain-control resistance, can be achieved.

(4) It provides a means to choose only one of the operational amplifiers for the reading of light-signal from every pixel throughout the entire sensor array. Therefore, it eliminates the non-uniformity in signal level due to chip to chip variation of the performance of the operational amplifiers within the chip array in the CIS module.

(5) It provides a cost reduction for the CIS module as fewer components are needed for the assembly.

Figure 4:
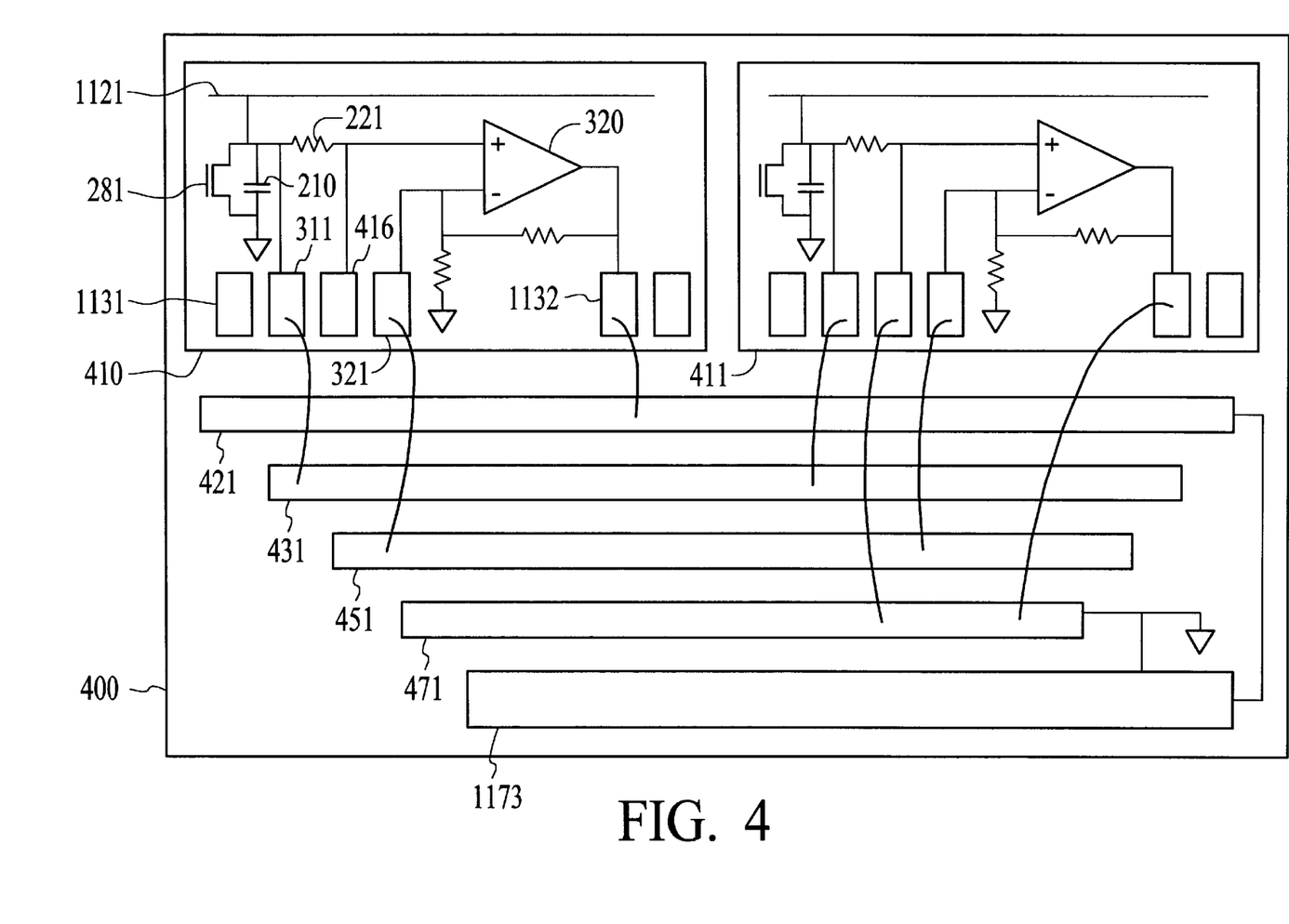
FIG. 4 illustrates a technique of the present invention which disables all other unwanted operational amplifiers in a CIS module comprising a chip array of the said improved sensor chips from FIG. 3.

Refer to FIG. 4 for the first embodiment of this invention. This is the case where both positive and negative power supplies are internally generated on chip and are not accessible to be disconnected from the operational amplifier. For simplicity of explanation of this invention, only the first two chips 410 and 411 of the chip array are shown here. Furthermore, only the relevant components are shown. The sensor chips 410, 411 . . . are attached to PCB 400 with the same conventional technique as described in FIG. 1 to form a chip array. For the purpose of description, only one operational amplifier 320 of the first chip 410 is selected to be active for reading every pixel of the entire chip array. The operational amplifiers of all other chips throughout the chip array are disabled. In the first chip 410, the output bonding pad 1132 is connected to the first common conductor stripe 421 on PCB 400. The non-inverting bonding pad 311 is connected to the second common conductor stripe 431 on PCB 400. The inverting bonding pad 321 is connected to the third common conductor stripe 451. The non-inverting terminal bonding pad 416 is left open without any connection. The connections of other bonding pads like 1131 remain the same as before. For the second chip 411 and the rest of the chips throughout the chip array, the output bonding pads and the non-inverting terminal bonding pads are connected to the fifth common conductor stripe 471. All non-inverting bonding pads are connected to the second common conductor stripe 431. The inverting bonding pads are connected to the third common conductor stripe 451. In this way, the gain-control resistors from different sensor chips are electrically connected in parallel resulting in a corresponding change of the equivalent gain-control resistance of the operational amplifier 320. As the gain of the operational amplifier 320 is determined by the ratio of the feedback resistance to the gain-control resistance, the gain of the activated operational amplifier 320 of the first chip is changed accordingly. By leaving a desired number of the inverting bonding pads open without any connection a desired gain of the operational amplifier 320 of the first chip 410 can be achieved. Or, by leaving all the inverting bonding pads open without any connection the original gain of the operational amplifier 320 will be maintained. That is, the gain of the operational amplifier 320 can be programmed by connecting all, or a desired number of, or none of the inverting bonding pads to the third common conductor stripe 451 to achieve the desired ratio of the feedback resistance to the gain-control resistance. The first common conductor stripe 421 is connected to the associated electronics block 1173 for further signal processing. The fifth common conductor stripe 471 is connected to the ground terminal of the associated electronic block 1173 as shown in the figure. Now, it can be seen that the equivalent integrating capacitance is the sum of the individual integrating capacitance of every charge integrating capacitor 210 throughout the chip array as the non-inverting bonding pads are connected in parallel. Therefore, for a given required value of the equivalent integrating capacitance the corresponding value of the individual integrating capacitor 210 is much smaller. This in turn makes it easier to design the sensor chip.

Next, it can be seen that the light-signal from the first pixel of the sensor array on PCB 400 is read out in the same manner as described in FIG. 1 through the operational amplifier 320 of the first chip 410. However, as all non-inverting bonding pads of the other sensor chips are connected to the same second common conductor stripe 431, the light-signal from all the other pixels throughout the chip array are also read through the operational amplifier 320 of the first chip 410 via the following path:

The respective non-inverting bonding pads-to-the second common conductor stripe 431 -to- the non-inverting bonding pad 311 of the first chip 410-to-the non-inverting terminal of the operational amplifier 320 of the first chip 410 through resistor 221.

Therefore, the light-signal from every pixel of the sensor array on PCB 400 is read out through only one operational amplifier 320 of the first chip 410. Of course, any of the other operational amplifiers from the other sensor chips in the chip array can be selected as an active operational amplifier as well. Thus, it can be seen that:

(1) one can select the operational amplifier from any chip to be active, and (2) one can further tailor a desired number of the operational amplifiers to be active to suit individual special applications such that each active operational amplifier is shared by a group of chips whose operational amplifiers were disabled.

Figure 5:
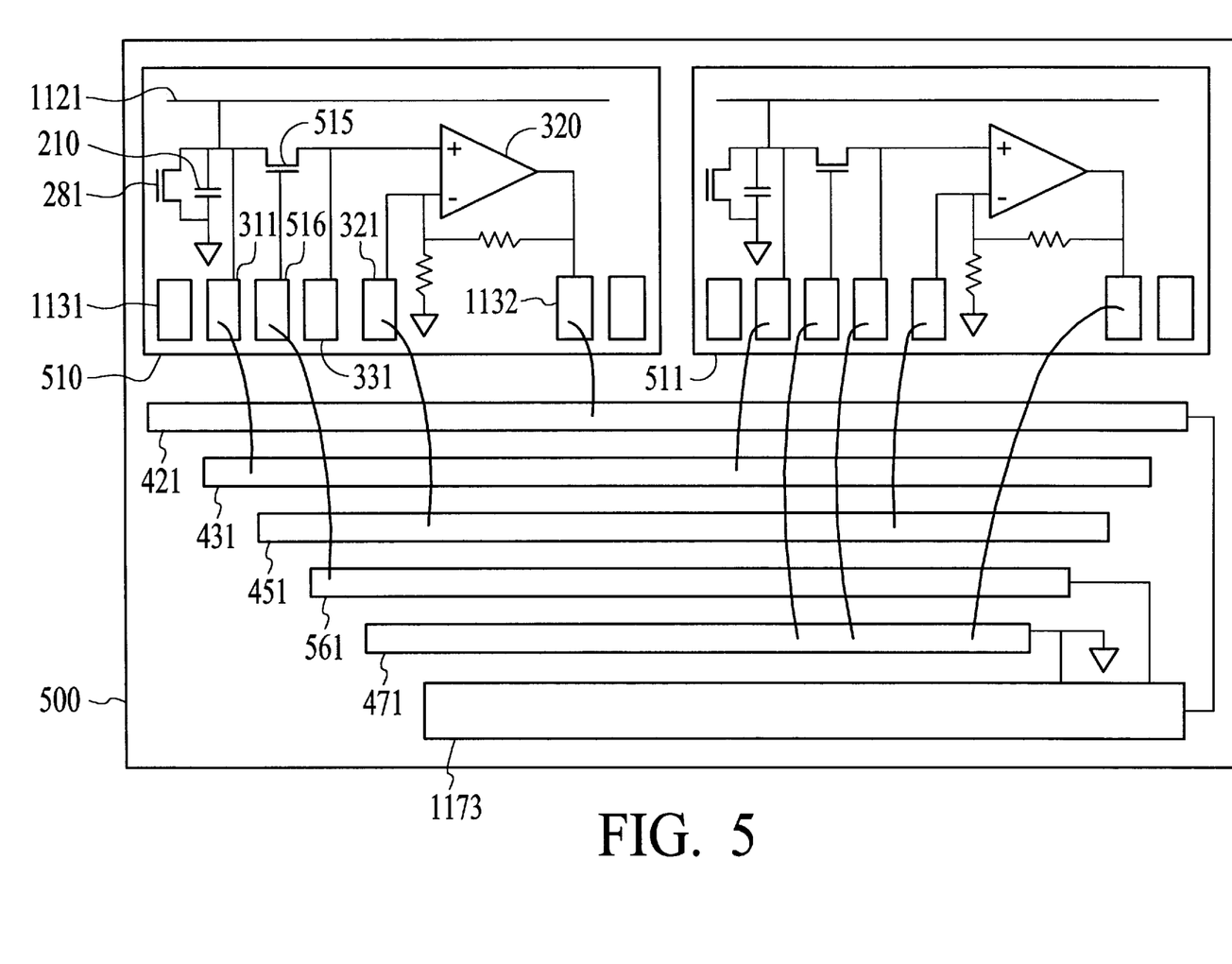
FIG. 5 illustrates a second technique of the present invention which disables all other unwanted operational amplifiers in a CIS module comprising a chip array of the said improved sensor chips wherein the input resistors connected to the non-inverting terminal of the operational amplifiers are replaced with transistors.

The second embodiment of this invention is illustrated in FIG. 5. A sensor array consisting of sensor chips 510, 511, . . . , etc. is formed on PCB 500 with the same conventional technique. However, an OP selection switch 515, which is an MOS transistor, is used to replace the resistor 221 in FIGS. 3 and 4. The control terminal of this OP selection switch 515 is connected to the switch bonding pad 516. A fourth common conductor stripe 561 is also provided on PCB 500. Similar to the description of FIG. 4, the first chip 510 is selected to have an active operational amplifier 320. The operational amplifiers of the second chip 511 and the rest of the chips throughout the chip array are all disabled. In the first chip 510, the output bonding pad 1132 is connected to the first common conductor stripe 421. The non-inverting bonding pad 311 is connected to the second common conductor stripe 431. The inverting bonding pad 321 is connected to the third common conductor stripe 451. The non-inverting terminal bonding pad 331 is left without any connection. The switch bonding pad 516 is connected to the fourth common conductor stripe 561. Inside the second chip 511 and the rest of the chips throughout the chip array, all non-inverting bonding pads are connected to the second common conductor stripe 431. As described before, all, a selected number of, or none of the inverting bonding pads of the chips with their operational amplifiers disabled are connected to the third common conductor stripe 451. Furthermore, all output bonding pads, all non-inverting terminal bonding pads and all switch bonding pads of the chips with their operational amplifiers disabled are connected to the fifth common conductor stripe 471 which in turn is connected to the ground terminal of the associated electronic block 1173 as shown. Like before, the first common conductor stripe 421 is connected to the associated electronic block 1173 for further signal processing. Also, the fourth common conductor stripe 561 is connected to the associated electronic block 1173. Thus, the associated electronic block 1173 maintains the OP switch for the active operational amplifier in a fully on status by holding the control gate of the OP selection switch 515 in an ON state through the following signal path:

Signal connection to the fourth common conductor stripe 561-to-switch bonding pad 516 -to-control gate of the OP selection switch 515

As the OP switch 515 of the first chip 510 is in a fully on status, the common line 1121 is electrically connected to the non-inverting terminal of the operational amplifier 320. Meanwhile, the OP selection switch of the second chip and the rest of the chips in the chip array are maintained in an off status (i.e., an electrically disconnected status where the non-inverting bonding pad is not connected to the non-inverting terminal of the corresponding operational amplifier). This is because their corresponding switch bonding pads are connected to the fifth common conductor stripe 471 which in turn is connected to the ground terminal of the associated electronics block 1173. Consequently, the common lines of the second chip and the rest of the chips in the chip array are not connected to the non-inverting terminals of their respective operational amplifiers. From this point on, the signal reading process is the same as described above in FIG. 4.

Figure 6:
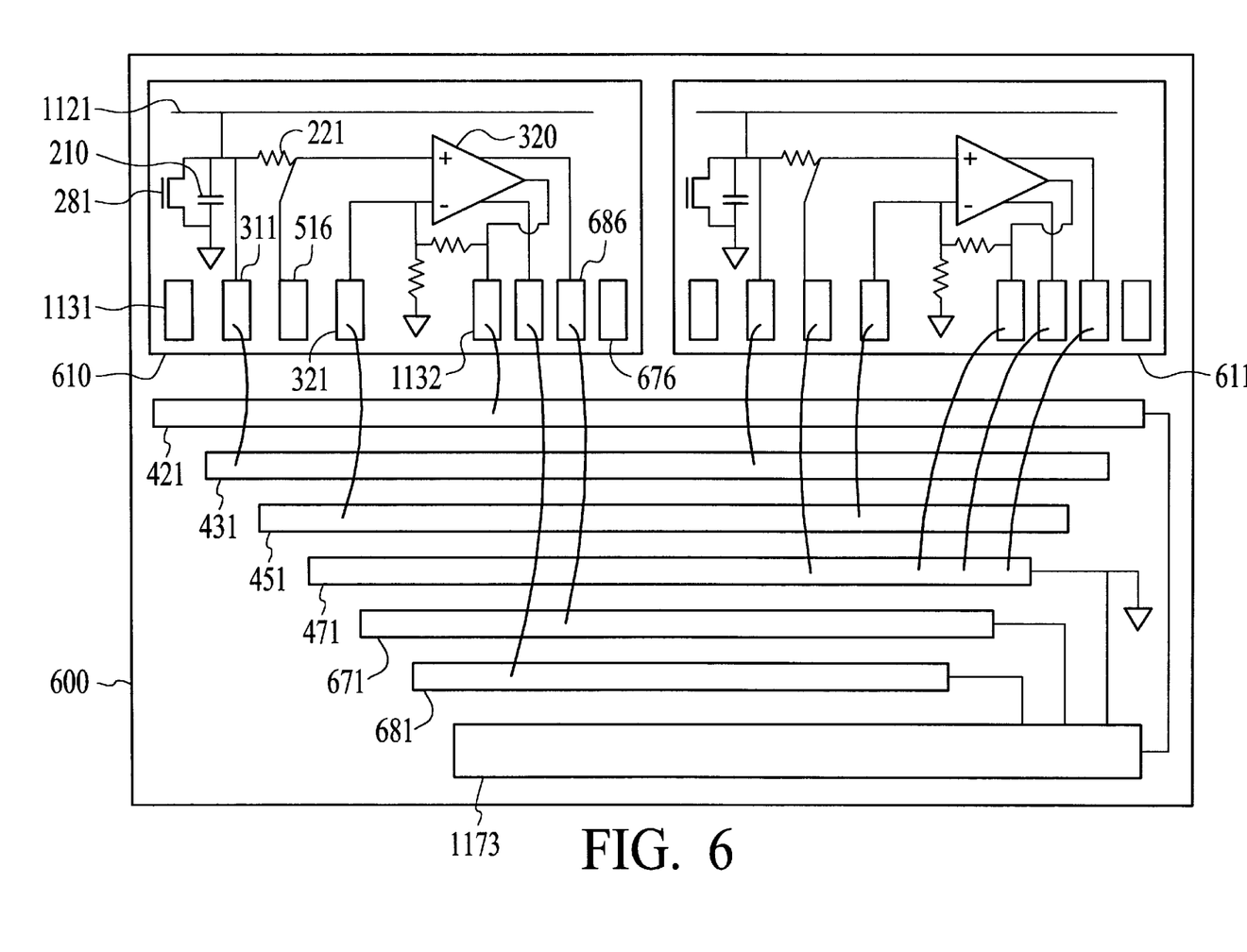
FIG. 6 illustrates a third technique of the present invention which disables all other unwanted operational amplifiers in a CIS module whereby a power supply is disconnected from the operational amplifiers to be disabled.

In the third embodiment of this invention both the positive and the negative power supplies of the operational amplifier are provided from an off chip means. This is illustrated in FIG. 6 wherein two additional bonding pads are provided as compared to the chip shown in FIG. 3. These additional bonding pads are positive power bonding pad 676 and negative power bonding pad 686. Like before, only two chips are shown for the explanation of this embodiment. Again, only operational amplifier 320 of the first chip 610 is active, the rest of the operational amplifiers of the second chip 611 and the rest of the chips in the chip array are disabled. Again, the output bonding pad 1132 of the first chip 610 is connected to the first common conductor stripe 421. All non-inverting bonding pads of the other chips in the chip array are connected to the second common conductor stripe 431. All, a selected number of, or none of the inverting bonding pads are connected to the third common conductor stripe 451 like in FIG. 4. For the first chip 610 with the active operational amplifier 320, the positive power bonding pad 676 is connected to the positive power stripe 671 and the negative power bonding pad 686 is connected to the negative power stripe 681. For the second chip 611 and the rest of the chips in the chip array with their disabled operational amplifiers, all output bonding pads, the non-inverting terminal bonding pads, the positive power bonding pads and the negative power bonding pads are all connected to the fifth common conductor stripe 471 which in turn is connected to the ground terminal on PCB 600. The positive power bonding pad 676 and the negative power bonding pad 686 respectively are connected to the associated electronic block 1173 through the aforementioned positive power stripe 671 and negative power stripe 681. The associated electronic block 1173 maintains the positive power stripe 671 at the desired positive supply voltage and the negative power stripe 686 at the desired negative supply voltage. Except for this difference in the technique to enable or disable the associated operational amplifiers, other operating principles, procedures and features of FIG. 6 remain the same as described in FIGS. 4 and 5.

With any of the above three embodiments serving as an example, one can apply this technique to design a chip to perform a variety of functions, in addition to the already illustrated example of a charge integration capacitor, where the needed capacitance value is too high to be practically implemented on a single chip. For example the function of a charge pump for the on-chip generation of power supplies for an operational amplifier requires a high capacitance value. With this technique, the desired high capacitance is achieved by connecting, in parallel, a number of smaller individual on-chip capacitors within a chip array. Similarly, when a programmable resistance value within a specified range is required, it can be achieved by programming a desired connection pattern of the individual on-chip resistors within the said chip array.

In conclusion, an improved technique has been illustrated to solve the problems of the current CIS module employing an array of sensor chips including an on-chip operational amplifier. The invention has been described using exemplary preferred embodiments. However, for those skilled in this field the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

We claim:

1. A sensor chip array for assembly of a contact image sensor module, comprises:
    a plurality of sensor chips wherein each of the plurality of sensor chips comprises, an operational amplifier; an output bonding pad connected to an output terminal of said operational amplifier; a non-inverting, bonding pad connected to a common point which in turn is connected to a common line of a mux switch array; a charge integrating capacitor connected to a non-inverting terminal of said operational amplifier through a resistor; an inverting bonding pad connected to an inverting terminal of said operational amplifier; and whereby the plurality of sensor chips are butted to form the sensor chip array which functions as a linear sensor array on a substrate.

2. The sensor chip array as described in claim 1 wherein said substrate is made of ceramic material or printed circuit board.

3. The sensor chip array as described in claim 1 wherein the non-inverting terminal of said operational amplifier is connected to a non-inverting terminal bonding pad.

4. The sensor chip array as described in claim 1 wherein said output bonding pad of is further connected to a first common conductor stripe on the substrate.

5. The sensor chip array as described in claim 1 wherein said non-inverting bonding pad is further connected to a second common conductive stripe on said substrate.

6. The sensor chip array as described in claim 1 wherein said inverting bonding pad of each chip within said chip array is further connected to a third common conductive stripe on said substrate.

7. The sensor chip array as described in claim 6 wherein only a selective number of the inverting bonding pads from said plurality of sensor chips are connected to said third common conductive stripe.

8. The sensor chip as described in claim 1 wherein the non-inverting terminal and the inverting terminal of said operational amplifier are inter-changeable.

9. The sensor chip as described in claim 1 wherein said operational amplifier is disabled by connecting both said output bonding pad and said non-inverting terminal to a fifth common conductor stripe which is in turn connected to a ground terminal on said substrate.

10. The sensor chip as described in claim 1 wherein said resistor is replaced with an OP switch and the control of the OP switch is connected to a switch bonding pad in such a manner that said operational amplifier is disabled by connecting said output bonding pad, said non-inverting terminal and said switch bonding pad to a fifth common conductor stripe which is in turn connected to a ground terminal on said substrate.

11. The sensor chip as described in claim 10 wherein said OP switch is a MOS (Metal-Oxide-Semiconductor) transistor.

12. The sensor chip as described in claim 1 wherein said sensor chip is further provided with two more bonding pads consisting of a positive power bonding pad connected to a positive power supply terminal of said operational amplifier and a negative power bonding pad connected to a negative power supply terminal of the said operational amplifier such that both the positive and negative power supplies to said operational amplifier can be disabled by connecting said positive power bonding pad, said negative power bonding pad, said output bonding pad and said non-inverting terminal pad to a fifth common conductor stripe which is in turn connected to a ground terminal on said substrate.

13. The sensor chip as described in claim 1 wherein a desired number of said operational amplifiers from said plurality of sensor chips are activated whereas the rest of said operational amplifiers from said plurality of sensor chips are disabled such that each of said output bonding pad of the activated operational amplifiers is connected to a different terminal on said substrate.

14. The sensor chip as describe in claim 13 wherein said desired number is one.

15. The sensor chip as described in claim 1 wherein each of said charge integrating capacitors from said sensor chips within the chip array is connected in parallel through off-chip connections to reach a desired large capacitance value for a corresponding function.

16. The sensor chip as described in claim 1 wherein, each of said charge integrating capacitors from said sensor chips within the chip array is connected together through off-chip connections to achieve a desired resultant resistance value for a corresponding function.

17. A method of assembling a sensor chip array comprising the steps of:
providing a plurality of sensor chips wherein each of the plurality of sensor chips further comprising the steps of:
providing an operational amplifier; connecting an output bonding pad to an output terminal of said operational amplifier;
connecting a non-inverting bonding pad to a common point which in turn is connected to a common line of a mux switch array;
connecting a charge integrating capacitor to a non-inverting terminal of said operational amplifier through a resistor;
connecting an inverting bonding pad to an inverting terminal of said operational amplifier; and butting the plurality of sensor chips to form the sensor chip array which functions as a linear sensor array on a substrate.

18. The method in claim 17 wherein said substrate is made of ceramic material or printed circuit board.

19. The method as described in claim 17 further comprising the step of connecting the non-inverting terminal of said operational amplifier to a non-inverting terminal bonding pad.

20. The method as described in claim 17 further comprising the step of connecting said output bonding pad to a first-common conductor stripe on the substrate.

21. The method as described in claim 1 further comprising the step of connecting said non-inverting bonding pad to a second common conductive stripe on said substrate.

22. The method as described in claim 17 further comprising the step of connecting said inverting bonding pad of each chip within said chip array to a third common conductive stripe on said substrate.

23. The method as described in claim 22 wherein only a selective number of the inverting bonding pads from said plurality of sensor chips are connected to said third common conductive stripe.

24. The method as described in claim 17 wherein the non-inverting terminal and the inverting terminal of said operational amplifier are inter-changeable.

25. The method as described in claim 17 wherein said operational amplifier is disabled by connecting both said output bonding pad and said non-inverting terminal to a fifth common conductor stripe which is in turn connected to a ground terminal on said substrate.

26. The method as described in claim 17 wherein said resistor is replaced with an OP switch and the control of the OP switch is connected to a switch bonding pad in such a manner that said operational amplifier is disabled by connecting said output bonding pad, said non-inverting terminal and said switch bonding pad to a fifth common conductor stripe which is in turn connected to a ground terminal on said substrate.

27. The method as described in claim 26 wherein said OP switch is a MOS (Metal-Oxide-Semiconductor) transistor.

28. The method as described in claim 17 wherein said sensor chip is further provided with two more bonding pads consisting of a positive power bonding pad connected to a positive power supply terminal of said operational amplifier and a negative power bonding pad connected to a negative power supply terminal of the said operational amplifier such that both the positive and negative power supplies to said operational amplifier can be disabled by connecting said positive power bonding pad, said negative power bonding pad, said output bonding pad and said non-inverting terminal pad to a fifth common conductor stripe which is in turn connected to a ground terminal on said substrate.

29. The method as described in claim 17 wherein a desired number of said operational amplifiers from said plurality of sensor chips are activated whereas the rest of said operational amplifiers from said plurality of sensor chips are disabled such that each of said output bonding pad of the activated operational amplifiers is connected to a different terminal on said substrate.

30. The method as described in claim 29 wherein said desired number is one.

31. The method as described in claim 17 wherein each of said charge integrating capacitors from said sensor chips within the chip array is connected in parallel through off-chip connections to reach a desired large capacitance value for a corresponding function.

32. The method as described in claim 17 wherein each of said charge integrating capacitors from said sensor chips within the chip array is connected together through off-chip connections to achieve a desired resultant resistance value for a corresponding function.

* * * * *